March 21, 1961  J. G. BIRRELL  2,975,541
FISHING FLOAT
Filed April 22, 1959  2 Sheets-Sheet 1
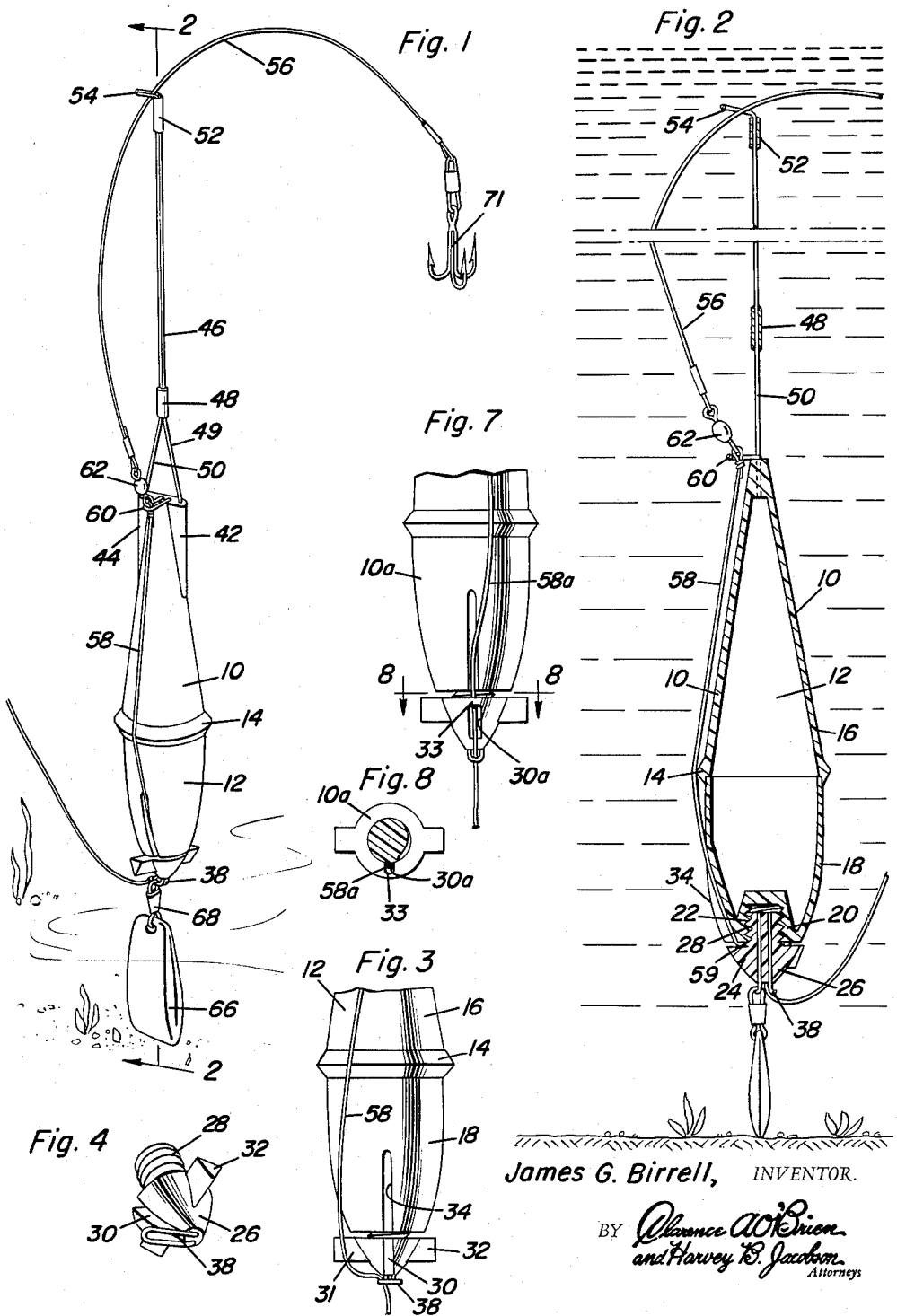
James G. Birrell, INVENTOR.
BY Clarence A. O'Brien
and Harvey B. Jacobson
Attorneys March 21, 1961

J. G. BIRRELL 2,975,541

FISHING FLOAT

Filed April 22, 1959

James G. Birrell
INVENTOR.

BY *Clarence A. O'Brien
and Harvey B. Jacobson*
Attorneys

United States Patent Office 2,975,541
Patented Mar. 21, 1961

2,975,541

FISHING FLOAT

James G. Birrell, 6319 Corpus Christi St., Houston, Tex.

Filed Apr. 22, 1959, Ser. No. 808,099

5 Claims. (Cl. 43—43.15)

This invention relates to fishing floats and more particularly to a multipurpose fishing float.

An object of the invention is to provide new and useful improvements in combination fishing floats enabling the float to be used as a popping float and a casting float and a sinking float permitting the fisherman to fish on the bottom but maintaining the fish hook off the bottom.

A float in accordance with the invention enables a fisherman to use the float for casting, as a popping float and as a float that enables fishing on the bottom. However, when used in the latter type of fishing the hook is maintained off the bottom, only the tip of a lead adapter touching the bottom as the float has sufficient buoyancy to maintain the float in this position. When the adapter touches an object it swings back and passes over the object (while retrieving).

Accordingly, an object of the invention is to provide a multipurpose fishing float which is constructed and arranged to be easily converted for various types of fishing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the fishing float at the bottom of the water.

Figure 2 is a sectional view taken on the line 2—2 of Figure 1.

Figure 3 is an enlarged elevational view of a portion of a float.

Figure 4 is a perspective view of an adapter used on the float.

Figure 7 is a fragmentary elevational view showing a modification of the float.

Figure 8 is a sectional view taken on the line 8—8 of Figure 7.

Figure 5:
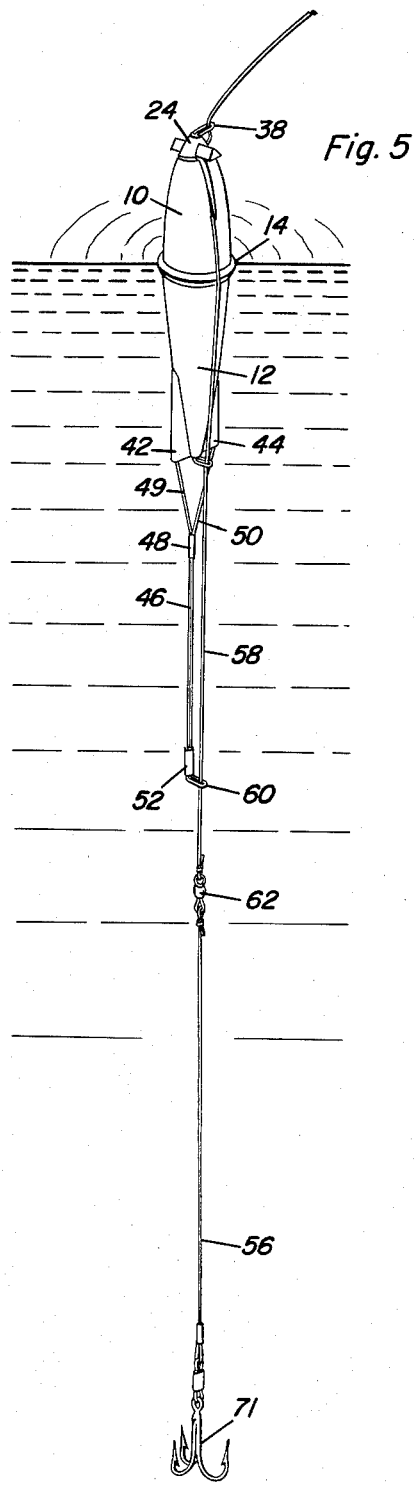
Figure 5 is a perspective view of the float when it is used as a popping float.
Figure 6:
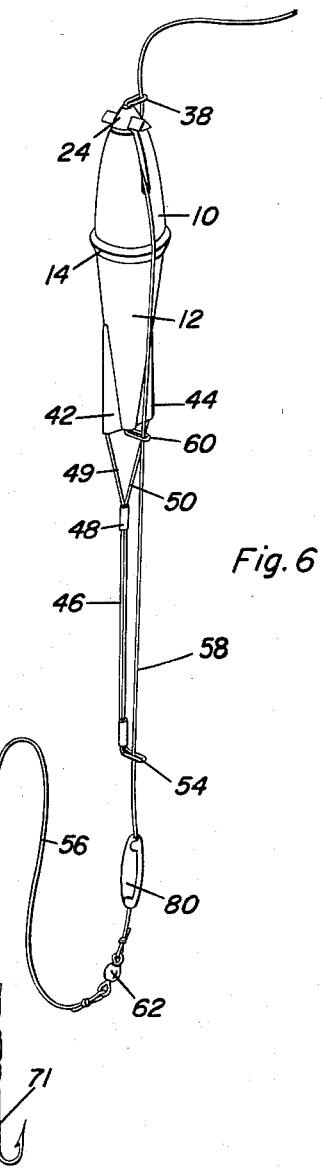
Figure 6 is a perspective view of the float showing it as it would appear when used as a casting float.

In the accompanying drawings there is a basic fishing float 10 which can be converted for use in a number of ways. The basic construction of the float remains essentially identical for all fishing types. The float body 12 is hollow and buoyant and it is preferably made of plastic. The body has a smoothly curved side wall and is tapered from end to end thereof. Seam 14 is at the juncture of the two sections 16 and 18 from which body 12 is constructed. Nose 20 of the float body has an internally threaded socket 22 in which a special plug 24 is threaded. The plug has an enlarged end 26 and a reduced, externally threaded shank 28 threaded in socket 22. There is a groove 30 (Figure 4) in the side wall of head 26 between the finger operating wings 31 and 32 that protrude laterally outwardly from the head. These wings are used to facilitate turning the head for loosening and tightening shank 28 in the socket 22. External groove 34 extending lengthwise of section 18 forms a substantial continuation of groove 30 when the head 24 is in one position of adjustment (see Figure 3). There is a wire loop 38 attached to head 24, as by having the ends of the wire embedded in the head of the adapter, and the loop extends laterally outwardly of the float with reference to the longitudinal central axis thereof.

The opposite end of the float body 12 has a pair of short fins 42 and 44 in which the inner ends of the spring metal wire 46 are embedded. A soldered clamp 48 is at the converged ends of the strands 49 and 50 of wire 46, and there is a soldered clamp 52 at the extremity of wire 46. Although these clamps are said to be soldered, it is to be clearly understood that they may be adhered in some other way to the wire 46. Loop 54 is at the extremity of wire 46 and has the flexible steel wire 56 extended therethrough. The inner end of wire 56 is attached to a fish line 58 which extends through a small eye 60 protruding laterally outwardly from body 12 in the region of fins 42 and 44. A swivel 62 is attached to wire 56, but is incapable of passing through eye 60 since it is of a larger diameter than the eye. The swivel 62 is attached to the fish line 58, and the fish line is extended through slot 34 and slot 30. A small portion 59 (Figure 2) of the fish line is clamped between the confronting faces of socket 22 and the head 26 of adapter 24 so that when the head is turned, after placing the fish line in slots 34 and 32, it is clamped tight therebetween and cannot slide in these grooves.

When used for fishing on the bottom, a weight 66 is attached by a conventional clamp 68 to the eye 38 (Figures 1 and 2). The fish line is extended through the slots 32 and 34, clamped in place as at 59 in Figure 2, and extended through eye 60. The steel leader wire 56 is attached by swivel 62 to fish line 58 and guided by eye 54. Fish hook 71 is attached to the end of the leader. The buoyancy of the body 12 and the weight of the sinker 66 is such so that only the tip of the lead weight sinker touches the bottom as the float has sufficient buoyancy to enable this condition to exist. When the lead sinker touches an object, it swings back and while retrieving passes over the object. Note that during these operations the hook 71 is spaced sufficiently from the bottom so that it will not snag. This condition exists because the spring metal leader 56 has been pulled down with reference to body 12 to the point at which it will bow as shown in Figure 1. Swivel 62 acts as a stop to establish this position when pulling the fish line 58 far enough to bring the swivel 62 against eye 60 through which it cannot pass.

To use the float as a popping float, the locking head is released by turning the head so that it becomes loose in socket 22. The line 58 is pulled up through an eye 54 to any chosen depth. Then the locking device is again set, clamping another portion 59 of the fish line between the confronting faces of socket 22 and adapter 24. A typical arrangement as a popping float is shown in Figure 5, where there is only one of numerous possible lengths of line between the fish hook and locking device.

To use the float as a casting float, the locking device is released and a small lead weight 80 is attached to the fishing line between swivel 62 and eye 54. A knot larger than eye 38, is tied in the line the desired distance that the fisherman wishes to fish. When the knot hits the eye 38, line will stop sliding through eye 38.

Seam 14 not only is the juncture between the sections of the body 12, but it also functions as a shoulder keeping the float from drawing too much water and puts more action into the float when used as a popping float.

The modified float 10a shown in Figures 7 and 8, is fully capable of all the actions of the described float 10 in Figures 1–6. The only difference is structural, wherein groove 30a has a bridge 33 extending across a portion thereof to hold the line 58a captive in groove 30a. This facilitates handling and adjusting by preventing line 58a from escaping from groove 30a.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A multipurpose convertible-type fishing device comprising an elongated buoyant body having a socket at one end of the body, an adapter having a portion thereof removably and adjustably connected with said one end by way of said socket, a surface portion of said body adjacent said one end having a longitudinal groove, said adapter having a groove cooperating with said first named groove and said adapter when adjusted having its groove either in line or out of line in respect to the first named groove, a fish line removably seated in said grooves, a portion of the line being adapted to be located between confronting faces of the adapter and said one end of the body in a manner to clampingly fasten the fish line to the body, an eye at the other end of the body, an elongated generally straight reach wire attached to and extending from said other end of said body adjacent to said eye, the fish line extending through said eye, a leader, a swivel connecting said leader to the end of the fish line, said swivel being of a diameter greater than the diameter of said eye to function as a stop when in engagement with said eye, and an additional eye on a free end of said reach wire through which the leader extends.

2. The structure defined in claim 1 and wherein said adapter is provided with a separate eye thus providing several simultaneously useable eyes, the eye on said adapter being fixed and projecting beyond the peripheral surfaces of the adapter and being permanently in line with the groove in the adapter.

3. The structure defined in claim 2 and wherein said adapter is provided on its peripheral surface with radially projecting wing-like lugs constituting members for holding and turning the adapter, said adapter having a screw-threaded shank and said socket being screw-threaded and said shank being screwed into said socket.

4. A multipurpose fishing float comprising a buoyant body, a friction clamping member for a fishing line carried at one end of said body and adapted to grip a fishing line in predetermined selected positions, a first eye at the other end of said body, a second eye carried by said clamping member, a third eye, reach means extending beyond and axially alined with said other end of said body and supporting said third eye at a position spaced from said body and from said first eye and through which the fishing line and a leader may be caused to pass, a spring metal leader, a swivel attaching said leader to the end of said fishing line, said leader extended through said third eye and limited in its longitudinal movement in one direction by engagement of said swivel with said first eye, said clamping member embodying a threaded adapter socket in said body accommodating said threaded adapter, the portion of said body containing said socket and said threaded adapter having adjustable parallel confronting faces between which a portion of the fish line is adapted to be gripped.

5. A multipurpose fishing device comprising an elongated body having fins at one end, a reach member embodying side-by-side wires secured together and having diverging end portions secured to the respective fins at corresponding inner ends of the wires, the outer ends of said wires being provided with a lateral loop constituting an eye, a second eye at the fin-equipped end of said body, the other end of said body having a longitudinal line seating groove in a surface thereof, said groove being in general alignment with said second mentioned eye, an adapter removably mounted on the other end of said body, said other end providing a line clamping surface and said adapter having a surface opposed thereto permitting a portion of a line to be inserted between and clampingly held by the surfaces, said adapter being provided with an eye cooperable with the already mentioned eyes and serving to accommodate a portion of a line which is adapted to be passed therethrough and also projecting freely from adjacent surfaces of the adapter to permit a readily connectible fastener on a sinker to be connected to said eye.

References Cited in the file of this patent

UNITED STATES PATENTS

| | | |
|---|---|---|
| 458,129 | Papin | Aug. 18, 1891 |
| 463,032 | Eichelberger | Nov. 10, 1891 |
| 1,193,684 | Gregory et al. | Aug. 8, 1916 |
| 1,759,381 | West | May 20, 1930 |
| 1,850,748 | Foster | Mar. 22, 1932 |
| 2,255,793 | Kridler | Sept. 16, 1941 |
| 2,456,254 | Caruso | Dec. 14, 1948 |
| 2,496,334 | Chapman | Feb. 7, 1950 |
| 2,759,291 | Foglio | Aug. 21, 1956 |